United States Patent [19]

Peterson

[11] Patent Number: 4,548,690

[45] Date of Patent: Oct. 22, 1985

[54] PHOTOACTIVATED POLYMERIZATION OF VINYL MONOMERS IN THE PRESENCE OF POLYSILANES AND AMINES

[75] Inventor: Donald G. Peterson, Shoreview, Minn.

[73] Assignee: Minnesota Mining and Manufacturing Company, St. Paul, Minn.

[21] Appl. No.: 584,504

[22] Filed: Feb. 28, 1984

[51] Int. Cl.$^4$ .............................................. C08F 2/50
[52] U.S. Cl. ......................... 204/159.23; 204/159.13; 430/919; 430/920
[58] Field of Search ....................... 204/159.13, 159.23

[56] References Cited

U.S. PATENT DOCUMENTS

| | | | |
|---|---|---|---|
| 4,057,657 | 11/1977 | Garnett et al. | 204/159.15 |
| 4,159,259 | 6/1979 | Yajima et al. | 204/159.13 |
| 4,260,780 | 4/1981 | West | 556/430 |
| 4,276,424 | 6/1981 | Peterson et al. | 556/430 |
| 4,314,956 | 2/1982 | Baney et al. | 528/28 |
| 4,324,901 | 4/1982 | West et al. | 556/430 |

FOREIGN PATENT DOCUMENTS 58-49717 3/1983 Japan .

OTHER PUBLICATIONS

Advances in Organomet. Chem.; Stone et al.; 17, 1979, pp. 407, 435, Academic Press.
Wilkinson et al., "Comprehensive Organomet. Chem.", vol. 2, 1982, Pergamon Press, pp. 365–397.
J. Poly. Sci., Polymer Letters Ed. Trefonas et al., "Organisilane . . .", vol. 21, 823–829 (1983), John Wiley & Sons.
Kosar "Light Sensitive Systems" (1965) John Wiley & Sons, pp. 158, 159, 160.
Roffey "Photopolym. of Surface Coatings" 1982, pp. 68, 69, 70, 71, John Wiley & Sons.

Primary Examiner—John C. Bleutge
Assistant Examiner—A. H. Koeckert
Attorney, Agent, or Firm—Donald M. Sell; James A. Smith; David L. Weinstein

[57] ABSTRACT

Combinations of a vinyl monomer (or prepolymer), a catenated polysilane and an amine are photopolymerizable in the presence of oxygen.

8 Claims, No Drawings

PHOTOACTIVATED POLYMERIZATION OF VINYL MONOMERS IN THE PRESENCE OF POLYSILANES AND AMINES

BACKGROUND OF THE INVENTION

Silicon is capable of extensive catenation. Thus, linear dimethyl polysilanes containing chains of up to twenty four directly bonded silicon atoms, high molecular weight polymers based on chains of silicon atoms and cyclopolysilanes with as many as thirty five silicon atoms in a single ring have all been prepared. (See. R. West in G. Wilkinson, F. G. A. Stone and E. W. Abel Eds., "Comprehensive Organo-metallic Chemistry," Pergamon Press, New York, N.Y., 1982, vol. 2, chapter 9.4.). Such materials can be degraded by application of heat (pyrolyzed) to give SiC ceramic materials, including in some cases strong SiC fibers (U.S. Pat. Nos. 4,260,780 and 4,276,424). Furthermore, some of the polysilanes can themselves be formed into films or fibers or molded, cast or spun from hot melt or from solution (U.S. Pat. No. 4,324,901).

SUMMARY OF THE INVENTION

It has been found in connection with the present invention that certain compositions comprising a vinyl (ethylenically unsaturated) monomer or prepolymer, a catenated polysilane and an organic amine can be polymerized by subjecting them to electromagnetic energy of suitable wavelength. The polysilane acts as a photoinitiator and the amine acts as an activator in the compositions. A particularly valuable feature of the invention is the relatively high rate of polymerization of these compositions in the presence of oxygen (e.g. atmospheric oxygen) compared with similar compositions in which the amine is excluded (which normally polymerize well in the absence of oxygen, but only slowly in the presence of oxygen). Since it is difficult and expensive to exclude oxygen in large scale industrial polymerization processes, the present invention enjoys an important advantage.

Thus, this invention relates, in one of its aspects to subjecting a mixture of (1) a vinyl monomer or prepolymer, and
(2) a polysilane having a chain of catenated silicon atoms (which may appear in an open chain or in a ring configuration) and a molecular weight of from about $5 \times 10^2$ to $5 \times 10^6$ which absorbs electromagnetic energy in the wavelength range of from about 250 to 400 nanometers; and
(3) an organic amine activator to electromagnetic energy having wavelengths in the absorption range of from about 250 to 400 nanometers (nm) until the degree of polymerization of the monomer or prepolymer has increased. Ordinarily the amine contains not more than 36 carbon atoms.

Preferably the foregoing mixture contains from about 0.01%–10% by weight of each of (2) and (3), based on the total weight of (1), (2) and (3). The polysilane is preferably (but not necessarily) soluble in the monomer or the prepolymer. For convenience herein, reference is often made only to monomers. However, it will be understood that prepoplymers are also contemplated and included.

In a preferred subclass of the processes according to the invention the polysilane has the formula

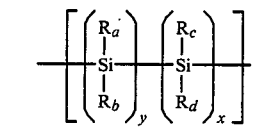

wherein $R_a$, $R_b$, $R_c$ and $R_d$ are individually selected from aliphatic, aromatic, substituted aromatic, araliphatic and cycloaliphatic groups containing not more than about 18 carbon atoms each (especially phenyl, methyl, cyclohexyl, phenethyl and p-methylphenyl), y and x are numbers from about 1 to 19,000, provided that the sum of y and x is from about 2 to 20,000.

It is understood that in an individual polysilane of formula I, all of the $R_a$ moieties are the same, as are all of the $R_b$ moieties, the $R_c$ moieties and the $R_d$ moieties (although $R_a$ may be the same as or different from $R_b$, and so on). Also, formula I does not indicate any particular degree of order relative to the occurrences of the

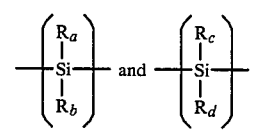

groupings. The end groups in these and the other polysilanes herein are normally not of any substantial significance and include such groups as OH, H and groups conforming to the definition of $R_a$.

More preferred for use in the process are aryl or aralkyl polysilanes in which either $R_a$ is aromatic or aralkyl and $R_b$, $R_c$ and $R_d$ are aliphatic or $R_a$ and $R_c$ are aromatic or aralkyl and $R_b$ and $R_d$ are aliphatic.

Particularly preferred due to the combination of their activity as photoinitiators and their solubility or miscibility with monomers and prepolymers are polysilanes of formula I in which $R_a$ is phenyl, or phenethyl and $R_b$, $R_c$ and $R_d$ are aliphatic and the ratio of x to y varies from about 3:1 to 1:20. Depending upon the ratio and values of x and y, the polysilanes falling within this definition have a wide range of boiling points or melting points.

Also particularly preferred for use in the process of the invention are the polysilanes of formula I wherein $R_a$ and $R_c$ are the same and are phenyl or phenethyl and $R_b$ and $R_d$ are the same and are selected from aliphatic, aromatic, substituted aromatic, araliphatic and cycloaliphatic groups, as broadly defined above. These polysilanes are particularly valuable due to the combination of their high activity as photoinitiators and their solubility in monomers, especially acrylic and methacrylic monomers.

The invention also relates to compositions comprising the mixtures of components (1), (2) and (3) utilized in the process and to the solid reaction products resulting from subjecting the compositions to activating radiation.

The process of the invention is particularly useful where it is desired to provide protective films or coatings on substrates since it has a number of advantages (such as speed, economy, efficiency and the like) over conventional polymerization techniques. The compositions of the invention can thus be conveniently applied as liquids to substrates then polymerized by means of electromagnetic energy, alone or together with elevated temperature, to form hard coatings.

The photoinitiating activity of the polysilanes involves their molecular degradation, although the exact course thereof is unclear. It does appear, however, to involve a free radical mechanism and the degradation has been found to be quite rapid. The photoinitiation of the monomers is particularly efficient in the absence of oxygen.

The polysilane chosen for a particular application will vary depending upon such factors as the nature of the system itself, the polymerization conditions, the desired characteristics of the ultimate product, etc. For example, polysilanes having number average molecular weights ($\overline{Mn}$) greater than 2,000 are normally much more effective initiators than are lower molecular weight materials. However, the lower molecular weight polysilanes (oligomers) are sufficiently active for some applications and have improved monomer miscibility. Where the greater activity of the higher molecular weight materials is required, they can often be dispersed in the monomer substrate by suitable mixing, for example ultrasonic mixing (sonication). Irradiation then normally results in a clear solution which subsequently becomes more viscous and hardens.

Polysilanes of the type utilized in the present invention are disclosed in U.S. Pat. Nos. 4,260,780, 4,276,424, 4,314,956 and 4,324,901.

The organic amines which are particularly suitable for use in the present invention can be aliphatic amines aromatic amines having at least one N-alkyl group, heterocyclic amines, or combinations thereof. They can be substituted or unsubstituted, wherein the substituents can be, for example, halogen atoms, hydroxy groups or alkoxy groups. Normally they fall within the general formula

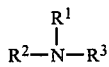

wherein $R^1$ and $R^2$ are individually selected from hydrogen, alkyl and alkenyl groups (linear or branched) containing up to 12 carbon atoms (1-12 carbon atoms in the case of alkyl groups and 2-12 carbon atoms in the case of alkenyl groups), cycloalkyl or cycloalkenyl groups having from 3 to 10 ring carbon atoms, and aryl, aralkyl and alkaryl groups having from 6 to 12 ring carbon atoms, $R^3$ has the same meaning as $R^1$ and $R^2$ except that it cannot be hydrogen and that it cannot be aryl when both $R^1$ and $R^2$ are aryl, and $R^2$ and $R^3$ taken together can be a divalent (linear or branched) group selected from an alkylene chain of 2-12 carbon atoms which can contain up to 3 carbon-carbon double bonds, (normally containing 2-12 carbon atoms in the saturated groups, 3-10 carbon atoms in the groups containing one double bond and 5-10 carbon atoms in the groups containing 2 or 3 double bonds) or an alkyleneoxyalkylene or alkyleneaminoalkylene chain containing from 4 to 12 carbon atoms.

Preferred among the foregoing are the secondary amines (wherein $R^2$ and $R^3$ are both other than hydrogen) and tertiary amines (wherein $R^1$, $R^2$ and $R^3$ are all other than hydrogen). As previously indicated, $R^1$, $R^2$ and $R^3$ can be substituted. The nature of such substituents is generally not significant and any substituent which does not substantially deter the process of the invention can be present.

Among the organic amines which are suitable for use in the present invention are methylamine, dimethylamine, trimethylamine, diethylamine, triethylamine, propylamine, isopropylamine, diisopropylamine, triisopropylamine, butylamine, hexylamine, tributylamine, t-butylamine, 2-methylbutylamine, N-methyl-N-butylamine, di-2-methylbutylamine, trihexylamine, tri-2-ethylhexylamine, didecylamine, tridodecylamine, tri-2-chloroethylamine, di-2-bromoethylamine, methanolamine, ethanolamine, diethanolamine, triethanolamine, methyldiethanolamine, dimethylethanolamine, methyldiethanolimine, isopropanolamine, propanolamine, diisopropanolamine, triisopropanolamine, butylethanolamine, dihexanolamine, 2-methoxyethylamine, di-2-ethoxyethylamine, tri-2-ethoxyethylamine, 2-hydroxyethyldiisopropylamine, 2-aminoethylethanolamine, allylamine, butenylamine, dihexadienylamine, cyclohexylamine, tricyclohexylamine, trimethylcyclohexylamine, bis-methylcyclopentylamine, tricyclohexenylamine, tricyclohexadienylamine, tricyclopentadienylamine, N-methyl-N-cyclohexylamine, N-2-ethylhexyl-N-cyclohexylamine, diphenylamine, phenyldimethylamine, methylphenylamine, ditolylamine, trixylylamine, tribenzylamine, triphenethylamine, benzyldimethylamine, benzyldihexylamine, tris-chlorophenethylenimine, N-methylethylenimine, N-cyclohexylethylenimine, piperidine, N-ethylpiperidine, 2-methylpiperidine, 1,2,3,4-tetrahydropyridine, 1,2-dihydropyridine, 2-, 3- and 4-picoline, N,N-dimethylaniline, morpholine, N-methylmorpholine, N-2-hydroxyethylmorpholine, N-2-ethoxyethylmorpholine, piperazine, N-methylpiperazine, N,N'-dimethylpiperazine, 2,2,-dimethyl-1,3-bis(3-(N-morpholinyl)-propionyloxy)propane, 1,5-bis(3-(N-morpholinyl)-propionyloxy)diethyl ether, and the like. The preferred amine activators are triethanolamine, morpholine, N-methyldiethanolamine and N,N-dimethylethanolamine.

Vinyl (ethylenically unsaturated) monomers which are suitable for use in connection with the present invention are free radical polymerizable and compatible with the polysilanes. These include acrylic acid, methacrylic acid, acrylate and methacrylate esters such as ethyl acrylate, t-butyl acrylate, methyl acrylate, butyl acrylate, 2-ethylhexyl acrylate, cyclohexyl acrylate, and methyl methacrylate, styrene and its derivatives such as 2-chlorostyrene, 2,4-dichlorostyrene, acrylamide and acrylonitrile. Most suitable are styrene and the simple acrylate and methacrylate esters such as ethyl acrylate, isooctyl acrylate, methyl methacrylate and vinyl acetate. Other monomers which can also be used are 2-(N-butylcarbamyl)ethyl methacrylate and 2-(N-ethylcarbamyl)ethyl methacrylate, N-vinyl-2-pyrrolidinone, the acrylic acid and methacrylic acid esters of 1,1-dihydroperfluoroalkanols such as 2,2,2-trifluoroethyl acrylate, 1,1-dihydroperfluoropropyl methacrylate, 1,1-dihydroperfluorobutyl acrylate and 1,1-dihydroperfluorooctyl methacrylate. Other monomers that can be incorporated into the compositions of the invention to increase their crosslink density include 1,4-butylene dimethacrylate or acrylate, 1,1,6,6-tetrahydroperfluorohexanediol diacrylate, ethylene dimethacrylate, glyceryl diacrylate or methacrylate, glyceryl triacrylate or trimethacrylate, pentaerythritol triacrylate or trimethacrylate, diallyl phthalate, dipentaerythritol pentaacrylate, neopentylglycol triacrylate, 1,3,5-tri(2-methacryloxyethyl)-s-triazine, divinylbenzene, multiacrylates and methacrylates such as ethyleneglycol diacrylate, trimethylolpropane triacrylate, pentaerythritol tri- and tetra-acrylate, the Michael reaction product of diethanolamine and trimethylolpropane triacrylate, and the like.

Mixtures of monomers can also be utilized in order to vary solubility, viscosity, volatility and crosslinking properties of the compositions. Examples of useful co-monomers are vinyl aromatics such as vinyl toluene, and vinyl esters such as vinyl acetate, etc.

Energy sources suitable for use in the process of the invention include sunlight, mercury arcs, low-, medium-, and high-pressure mercury lamps, plasma arcs, ultraviolet light emitting diodes, and ultraviolet emitting lasers. Ultraviolet light activation of the polysilanes used in this invention can be brought about with the use of such commercially available ultraviolet light sources as the model LCU 750 medium pressure mercury lamp (UVEXS, Sunnyvale, CA), the model QC 1202 ultraviolet lamp (RPC Equipment, Plainfield, IL) and the Rayonet Model RPR 100 (the Southern New England Ultraviolet Company, Hamden, Conn.).

As mentioned previously, polymerization according to the process of the invention is believed to take place primarily by means of the free radical mechanism. The initial mixtures of the vinyl monomers, polysilanes and amines according to the invention are frequently of low viscosity, too low in fact to be handled conveniently in some applications. In order to increase the viscosities to a more desirable level in such cases, the mixtures can be prepolymerized until a small degree of polymerization (e.g. 5–10%) has taken place, thus forming a syrup. The irradiation during the prepolymerization is preferably of the same nature as that used for the remainder of the polymerization, so that the polymer formed during both steps is the same. Additional constituents can be incorporated into the mixture and/or the mixture can be coated on a surface or otherwise manipulated at the syrup stage. The polymerization can thereafter be continued, by further irridation or thermally to form the solid polymeric material.

The process of the invention can often be carried out successfully in relatively thick sections (up to 2 centimeters or even greater) where the polymerizable mixture is relatively transparent to the irradiating energy (or at least transmits a major portion thereof). However, additives such as fillers, extenders, pigments and dyes must be taken into consideration.

The invention is further illustrated by the following nonlimiting examples, in which all parts are given by weight unless otherwise stated. Examples A–S describe the preparation of a number of polysilane photoinitiators and Examples 1–14 illustrate the practice of the present invention.

The molecular weights of the polymers referred to in the following examples, as well as in the claims and throughout the specification, are number average molecular weights $\overline{M}_n$ (polystyrene equivalent) measured by means of gel permeation chromatography (GPC, also sometimes referred to as size exclusion chromatography). The molecular weight determinations were carried out on tetrahydrofuran solutions of the polymer using the procedure described by West et al, Am. Ceram. Soc. Bull., 62 (8) 899 (1983).

EXAMPLE A

Isomeric-PhC$_2$H$_4$SiMe.

The intermediate isomeric phenethylmethyldichlorosilane was prepared from methyldichorosilane and styrene using the method described by J. L. Speier at pages 435ff of ADVANCES IN ORGANOMETALLIC CHEMISTRY, Academic Press, Edited by F. G. A. Stone and R. West, 17 (1979). It contained approximately 65% of the 2-phenethyl isomer and 35% of the 1-phenethyl isomer.

The polysilane was prepared as follows: To a 3 necked flask fitted with a reflux condenser, a high speed mechanical stirrer, a thermometer and an addition funnel was added under nitrogen 15.9 g of sodium and about 500 ml of toluene (freshly distilled). The addition funnel was charged with 73.81 g of the dichlorosilane intermediate. The solution was heated to toluene reflux and stirred rapidly to produce very finely divided sodium. The heat source (mantle) was removed and the dichlorosilane was added quickly (over 15 minutes), the temperature in the pot remaining at 87°–98° C. The mixture was carefully brought to reflux still stirring and the heating mantel was again removed. A very gentle exothermic reaction ensued and the viscosity of the flask contents increased, making it necessary to cool the solution to approximately 100° C. in order to keep it from foaming. The stirring speed was also decreased.

The reaction was allowed to continue overnight with stirring and the resulting viscous purple solution was poured into 4.5. liters of isopropyl alcohol with rapid, vigorous stirring to shred the polymer. The solid was removed by filtration, dried, redissolved in toluene by stirring for 36 hours, and then precipitated by pouring into 3 liters of methyl alcohol. The mixture was stirred for 12 hours and the (white) precipitate, isomeric (65/35 2-phenethyl/1-phenethyl)poly phenethylmethylsilane, was isolated by filtration and drying. The yield was 8.21 g. The mother liquor from the first filtration was roto evaporated to give 30.8 g of viscous liquid oligomers. GPC analysis of the polymer showed a major peak at Mn $8.5\times10^5$, a minor peak at $\overline{M}n$ $1.2\times10^4$.

Table I describes polysilanes B–S, which were prepared using the process of Example A. The dichlorosilane intermediates were obtained from Petrarch Systems, Inc., Bristol, PA. Example A is included in the table for convenience of reference. In the second column (which gives the molecular makeup of the polysilanes), a single parenthetical species indicates a homopolymer (R$_a$SiR$_b$ is the same as R$_c$SiR$_d$) while two parenthetical species indicate a copolymer. The number following the parentheticals in the copolymers indicates the mole ratio of the first to the second parenthetical species. In all, the side groups present in Polymers A–S include phenyl, methyl, n-hexyl, cyclohexyl, phenethyl, p-methylphenyl (i.e. p-tolyl) and the residue of isooctylacrylate. The phenethyl groups in the polysilanes (i.e. in Polymers A, B, C, E, L and M) are a mixture of the 2- and 1-isomers in the ratio of approximately 65:35. All temperatures are given in °C.

TABLE I

| Polymer | Polysilane (a) | (UV λmax, ε/Si × 10$^{-3}$) (b) | Molecular Weight ($\overline{M}_n$, GPC) (c) | Comments |
|---|---|---|---|---|
| A | (PhC$_2$H$_4$SiMe) | 306 nm, 6.8 | $8.5 \times 10^5$, $1.2 \times 10^4$ | White powder, Bimodal distn |
| B | (PhC$_2$H$_4$SiMe).79 | 305 nm, 5.1 | $3.3 \times 10^5$, $1.1 \times 10^4$ | Bimodal MW distribution, |

TABLE I-continued

| Polymer | Polysilane (a) | (UV λmax, ε/Si × $10^{-3}$) (b) | Molecular Weight ($\overline{M}_n$, GPC) (c) | Comments |
|---|---|---|---|---|
| C | (Me$_2$Si)(PhC$_2$H$_4$SiMe).56(PhMeSi) | 327 nm, 5.8 | 4 × $10^5$, 8.4 × $10^4$ | waxy solid softens @ 90–120° Bimodal MW distribution resinous solid softens @ 130–170° |
| D | (CyclohexylSiMe).63(PhMeSi) | 334 nm, 7.8 | 8 × $10^4$ | Resinous solid softens @ 125–160° |
| E | (PhC$_2$H$_4$SiMe).67(cyclohexylMeSi) | 310 nm, 6.7 | 1.5 × $10^5$ | Sticky elastomer softens @ 50–120° |
| F | (CyclohexylSiMe).66(Me$_2$Si) | 309 nm, 4.3 | 9 × $10^5$, 7 × $10^4$, 9 × $10^3$ | Trimodal MW distribution, waxy solid softens @ 120–150° |
| G | (cyclohexylSiMe) | 326 nm, 7.6 | 1.7 × $10^5$ | White powder softens >200° |
| H | (p-tolylSiMe).91(Me$_2$Si) | 332 nm, 5.0 | 1.7 × $10^5$, 8 × $10^3$ | Bimodal MW distribution, waxy solid softens @ 130–170° |
| I | (PhMeSi) | 341 nm, 7.0 | 1.0 × $10^4$, 4 × $10^3$ | Bimodal MW distribution white powdery solid |
| J | (PhMeSi) (d) | 335 nm, 2–3 | <3.5 × $10^3$ | Yellow mobile oil |
| K | (Ph$_2$Si).89(Me$_2$Si) | 334 nm, 5.2 | 3.5 × $10^5$ | While powder softens >170° |
| L | (Ph$_2$Si)$_{1.65}$(PhC$_2$H$_4$SiMe) | 352 nm, 2.5 | 3.0 × $10^5$ | White powder |
| M | (PhC$_2$H$_4$SiMe).5(p-tolylSiMe) | 325 nm, 5.3 | 3.9 × $10^5$ | Resinous solid softens @ 130–170° |
| N | (Ph$_2$Si)(PhMeSi) | 343 nm, 4.5 | 1.05 × $10^4$ | White powder |
| O | (isooctylacrylate)$_{19}$(PhMeSi) | 330 nm broad | 7.10$^5$, 1.6 × $10^4$ | Sticky white semisolid |
| P | (PhMeSi)(Me$_2$Si) | 333 nm, 4–5 | 1.7 × $10^5$, 1.8 × $10^4$, 4.5 × $10^3$ | Trimodal distribution White waxy solid |
| Q | (PhMeSi)(Me$_2$Si) (d) | 315 nm, 2–3 | <3.5 × $10^3$ | Yellowish oil |
| R | (CyclohexylMeSi)(Me$_2$Si) (d) | 285 nm, 0.7 | <3.5 × $10^3$ | Colorless oil |
| S | (CyclohexylMeSi)(n-hexylMeSi) (d) | 300 nm, 0.2 | <3.5 × $10^3$ | Colorless oil |

(a) Proportions of different silyl groups in copolymers were determined by proton nuclear magnetic resonance spectroscopy.
(b) Extinction coefficients ε are tabulated per silicon atom, × $10^{-3}$.
(c) Molecular weights were determined by gel phase chromatography and are reported in polystyrene equivalents.
(d) Oligomers.

The constituents in the following examples were mixed in glass containers under normal conditions (in contact with atmospheric oxygen and at ambient temperatures). A small amount of each of the resulting liquid compositions was then dropped onto polyethylene-coated paper and subjected to ultraviolet irradiation by running the paper through a Linde PS-2800-4MX Ultraviolet Photocuring Unit (available from the Linde Photocure Systems Division of the Union Carbide Corporation). The unit contained 4 low pressure mercury vapor lamps, each 3 feet (0.9 meter) long, rated at 100 watts per inch of length and radiating in the range of 253.7–400 nm. The coated paper carrying the liquid compositions was placed on a belt running through the unit at a speed of 22 feet (6.7 meters) per minute at a distance of about 1.5 feet (0.46 meter) from the lamps. The length of belt exposed to the lamps was 9 feet (2.74 meters) and each sample was run through the unit twice. No effort was made to exclude atmospheric oxygen from the samples after applying them to the coated paper. The compositions tested are given in Table II.

The monomers and amines utilized in the examples and their reference numbers in the table are as follows:

| Monomer | Number |
|---|---|
| Phenoxyethyl acrylate | 1 |
| Tetrahydrofurfuryl acrylate | 2 |
| 1,6-Hexanediol diacrylate | 3 |
| Tripropyleneglycol diacrylate | 4 |
| Isobornyl acrylate | 5 |
| β-carboxyethyl acrylate | 6 |

| Amine | Number |
|---|---|
| N—methyldiethanolamine | 1 |
| N,N—dimethylethanolamine | 2 |
| Triethanolamine | 3 |
| Morpholine | 4 |
| Hexylamine | 5 |
| N,N—dimethylaniline | 6 |

The polysilanes are referred to in the table by the letters of the Examples of their preparation. The compositions are given in percentages by weight.

TABLE II

| Example Number | Monomer No. | Monomer Percent | Polysilane No. | Polysilane Percent | Amine No. | Amine Percent |
|---|---|---|---|---|---|---|
| 1 | 1 | 90.00 | Q | 4.88 | 1 | 5.12 |
| 2 | 1 | 89.97 | Q | 5.15 | 2 | 4.88 |
| 3 | 2 | 89.48 | R | 5.19 | 3 | 5.33 |
| 4 | 3 | 88.45 | Q | 6.71 | 1 | 4.84 |
| 5 | 4 | 87.60 | Q | 7.49 | 1 | 4.91 |
| 6 | 3 | 87.58 | S | 7.14 | 1 | 5.28 |
| 7 | 3 | 87.50 | R | 7.16 | 1 | 5.34 |
| 8 | 4 | 91.99 | A | 4.05 | 1 | 3.96 |
| 9 | 5 | 86.59 | S | 6.92 | 2 | 6.49 |
| 10 | 3 | 95.20 | Q | 2.98 | 3 | 1.82 |
| 11 | 4 | 95.86 | Q | 3.15 | 4 | 0.99 |
| 12 | 6 | 93.69 | P | 2.05 | 4 | 4.26 |
| 13 | 4 | 88.50 | Q | 4.24 | 5 | 7.26 |
| 14 | 4 | 89.26 | Q | 6.47 | 6 | 4.27 |

All of the foregoing were found to be non-tacky solids after they had been run through the photocuring unit as described previously. On the other hand, mixtures of any of the foregoing monomers with 0.01% to 10% of only one of the other two constituents (the polysilane or the amine) would still be liquid after being run through the photocuring unit.

What is claimed is:

1. A process which comprises subjecting a mixture of
   (1) a vinyl monomer or prepolymer;
   (2) a polysilane photoinitiator having a main chain of catenated silicon atoms and a molecular weight ($\overline{M}_n$) of from about $5 \times 10^2$ to $5 \times 10^6$ which absorbs electromagnetic energy in the wavelength range of from about 250 to 400 nanometers; and
   (3) an organic amine activator to radiation in the range of about 250–400 nanometers until the degree of polymerization of the monomer or prepolymer has increased.

2. A process according to claim 1 wherein the mixture contains from about 0.01% to 10% by weight of each of (2) and (3), based on the total weight of (1), (2) and (3).

3. A process according to claim 1 in which the polysilane is of the formula

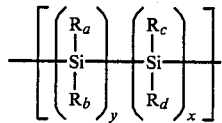

wherein $R_a$, $R_b$, $R_c$ and $R_d$ are individually selected from aliphatic, aromatic, substituted aromatic, araliphatic and cycloaliphatic groups containing not more than about 18 carbon atoms each, and y and x are numbers from about 1 to 19,000, provided that the sum of y and x is from about 2 to 20,000.

4. A process according to claim 1 wherein the amine activator contains not more than 36 carbon atoms.

5. A photopolymerizable composition which comprises a mixture of
   (1) a vinyl monomer or prepolymer;
   (2) a polysilane photoinitiator having a main chain of catenated silicon atoms and a molecular weight ($\overline{M}_n$) from about $5 \times 10^2$ to $5 \times 10^6$ which absorbs electromagnetic energy in the wavelength range of from about 250 to 400 nanometers; and
   (3) an organic amine activator.

6. A composition according to claim 5 which contains from about 0.01% to 10% by weight of each of (2) and (3) based on the total weight of (1), (2) and (3).

7. A composition according to claim 5 in which the polysilane is of the formula

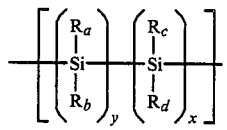

wherein $R_a$, $R_b$, $R_c$ and $R_d$ are individually selected from aliphatic, aromatic, substituted aromatic, araliphatic and cycloaliphatic groups containing not more than about 18 carbon atoms each, and y and x are numbers from about 1 to 19,000, provided that the sum of y and x is from about 2 to 20,000.

8. A composition according to claim 5 wherein the amine activator contains not more than 36 carbon atoms.

* * * * *